H. B. PHILLIPS.

HOOP FASTENING FOR BUCKETS, &c.

No. 10,337. Reissued June 5, 1883.

WITNESSES:

G. D. Garfield

C. Sedgwick

INVENTOR:

H. B. Phillips

BY Munn & Co

ATTORNEYS.

BEST AVAILABLE COPY

UNITED STATES PATENT OFFICE.

HIRAM B. PHILLIPS, OF PALESTINE, TEXAS.

HOOP-FASTENING FOR BUCKETS, &c.

SPECIFICATION forming part of Reissued Letters Patent No. 10,337, dated June 5, 1883.

Original No. 272,469, dated February 20, 1883. Application for reissue filed May 5, 1883.

*To all whom it may concern:*

Be it known that I, HIRAM B. PHILLIPS, of Palestine, in the county of Anderson and State of Texas, have invented a new and Improved Hoop-Fastening for Buckets, Barrels, and other Articles, of which the following is a full, clear, and exact description.

The object of my invention is to hold the hoops on buckets, barrels, kegs, and other like vessels in an effective manner, and to prevent them from dropping off when the vessel dries and shrinks.

The invention consists of a metal strap provided with side tongues, and having its ends bent around the upper and lower hoops and the side tongues bent around the intermediate hoops.

My invention further consists of certain details of construction, as hereinafter more fully set forth, and pointed out in the claims.

Reference is to be had to the accompanying drawings, forming part of this specification, in which similar letters of reference indicate corresponding parts in all the figures.

Figure 1:
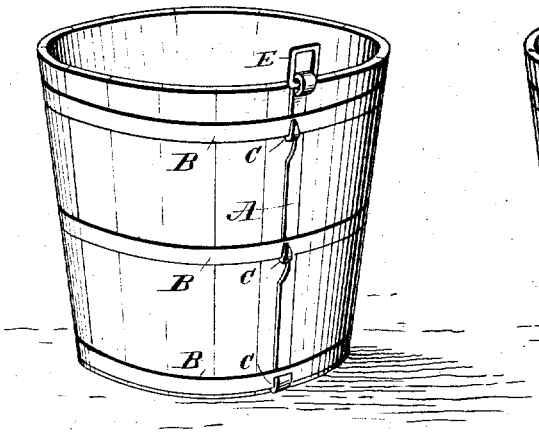
Figure 2:
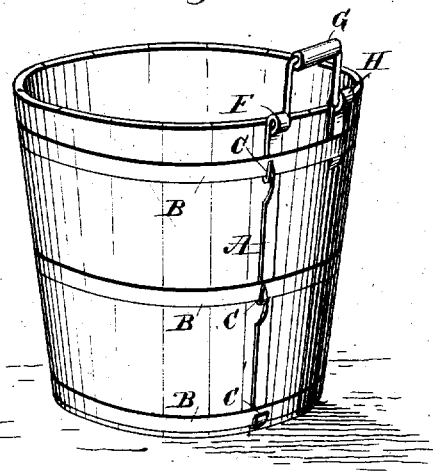
Figure 3:
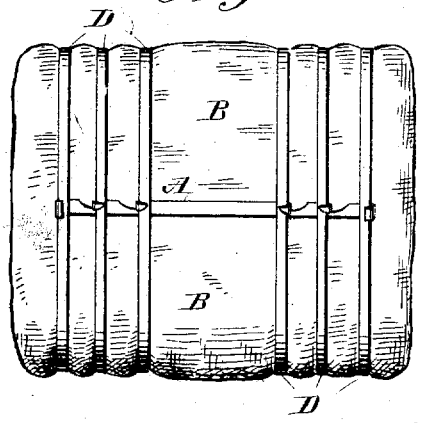
Figure 4:
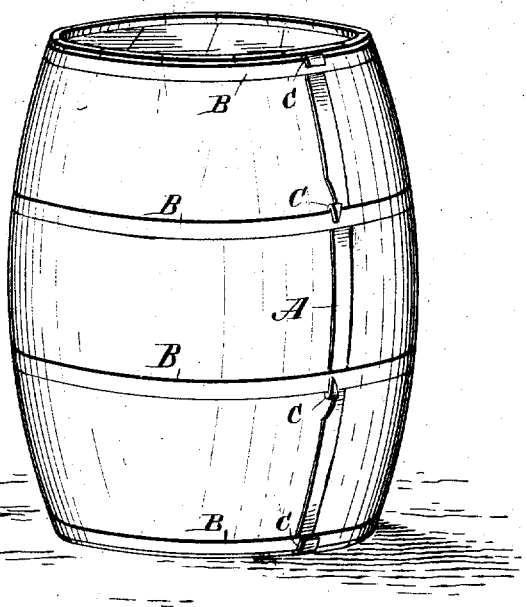

Figure 1 is a perspective view of a pail provided with my improved fastening. Fig. 2 is a perspective view of another pail, showing a modified construction for securing a handle. Fig. 3 is a perspective view of a hooped bale provided with my improved hoop-fastening or tie-strap. Fig. 4 is a perspective view of a barrel provided with my improved hoop-fastening.

The simplest construction of my improved hoop-fastening consists in a metal strap, A, crossing or passing under the hoops B, and having the upper end bent over the uppermost hoop B and the lower end bent up under the lowest hoop B, as shown in Fig. 4. The middle hoops are secured by making slanting cuts in the side edge of the strap A, and bending the tongues, C, thus formed under or over the middle hoops, as is also shown in Fig. 4. As shown in Fig. 1, the upper end of the strap is turned down to form a loop or eye, F, for a handle, E; and, as shown in Fig. 2, a loop, F, for one end of a swinging handle, G, is formed by the bent and lapped upper end of the strap A, and the other end of the handle fits into a separate handle-loop, H, attached to the bail or bucket. The strap crosses the hoops and holds each in place, so that if the barrel, bucket, tub, &c., shrinks, the hoops cannot fall off. This is of great importance, for heretofore it has been customary to drive the hoops of shrunken vessels up very tight, and when the vessels begin to swell they burst the hoops and the vessels are destroyed.

This hoop-fastening is applicable to any barrel, keg, pail, or other like vessel, regardless of the number of hoops.

Having thus described my invention, I claim as new and desire to secure by Letters Patent—

1. As an improved article of manufacture, a hoop-fastening consisting of a metal strap having between its ends tongues at such distances apart as when bent to embrace the hoops of barrels, kegs, and other vessels, substantially as and for the purposes herein shown and described.

2. The combination, with the hoops B of a barrel, keg, or other vessel, of a metal strap, A, provided with side tongues, C, and having the ends bent over the upper and lower hoops, and having the tongues C bent over the intermediate or middle hoops, substantially as herein shown and described, and for the purpose set forth.

3. The combination, with the hoops B of a bucket, of a metal strap, A, having its lower end and tongues bent over the hoops B, and having its upper end bent to form a loop for the handle or bail of the pail, tub, or bucket, substantially as herein shown and described, and for the purpose set forth.

HIRAM B. PHILLIPS.

Witnesses:
A. W. GREGG,
M. H. ADDINGTON.